United States Patent
Zhao et al.

(10) Patent No.: US 9,337,466 B2
(45) Date of Patent: *May 10, 2016

(54) POWER TERMINAL CONNECTOR

(71) Applicant: Tyco Electronics Corporation, Berwyn, PA (US)

(72) Inventors: Weiping Zhao, Superior Township, MI (US); Douglas Scott Simpson, Mount Clemens, MI (US)

(73) Assignee: TYCO ELECTRONICS CORPORATION, Berwyn, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/493,757

(22) Filed: Sep. 23, 2014

(65) Prior Publication Data

US 2015/0087182 A1    Mar. 26, 2015

Related U.S. Application Data

(63) Continuation-in-part of application No. 13/708,202, filed on Dec. 7, 2012, now Pat. No. 8,628,335, and a continuation-in-part of application No. 14/031,933, filed on Sep. 19, 2013, now Pat. No. 9,065,192.

(60) Provisional application No. 61/882,433, filed on Sep. 25, 2013.

(51) Int. Cl.
*H01R 11/30* (2006.01)
*H01M 2/20* (2006.01)
(Continued)

(52) U.S. Cl.
CPC .............. *H01M 2/206* (2013.01); *H01M 2/22* (2013.01); *H01R 4/023* (2013.01); *H01R 11/288* (2013.01); *H01R 13/187* (2013.01)

(58) Field of Classification Search
CPC ....................................................... H01R 35/02
USPC ................... 439/33, 845, 846, 847, 844, 843
See application file for complete search history.

(56) References Cited

U.S. PATENT DOCUMENTS 3,396,364 A  8/1968  Bonhomme
5,033,982 A  7/1991  Lucas
(Continued)

FOREIGN PATENT DOCUMENTS

JP    H11 67184 A    3/1999
WO    2011/082722 A1  7/2011

OTHER PUBLICATIONS

International Search Report, International Application No. PCT/US2014/057144, International Filing Date Sep. 24, 2014.

*Primary Examiner* — Phuong Dinh

(57) ABSTRACT

A power terminal connector includes a flexible conductor having a first mounting portion, a second mounting portion and a flexible section between the first and second mounting portions. The first mounting portion is terminated directly to a power terminal of a first battery module. A female terminal is coupled to the second mounting portion. The female terminal has a terminal body having a receptacle receiving a power terminal of a second battery module. The terminal body is terminated to the second mounting portion to mechanically and electrically connect the terminal body to the flexible conductor. A contact spring is received in the receptacle and is electrically connected to the terminal body. The contact spring has spring beams defining interfaces for the power terminal to create a power path to the power terminal of the second battery module.

20 Claims, 7 Drawing Sheets

(51) Int. Cl.
*H01M 2/22* (2006.01)
*H01R 4/02* (2006.01)
*H01R 11/28* (2006.01)
*H01R 13/187* (2006.01)

(56) References Cited

U.S. PATENT DOCUMENTS

| | | |
|---|---|---|
| 5,154,646 A | 10/1992 | Shoup |
| 5,886,501 A | 3/1999 | Marks et al. |
| 6,482,049 B1 | 11/2002 | Swearingen |
| 6,672,911 B2 | 1/2004 | Zhao et al. |
| 7,229,327 B2 | 6/2007 | Zhao et al. |
| 7,294,020 B2 | 11/2007 | Zhao et al. |
| 7,458,862 B2 | 12/2008 | Zhao et al. |
| 8,628,335 B1 * | 1/2014 | Zhao ............... H01M 2/206 439/33 |
| 2003/0060090 A1 | 3/2003 | Allgood et al. |
| 2006/0270277 A1 | 11/2006 | Zhao et al. |
| 2006/0270286 A1 | 11/2006 | Zhao et al. |
| 2007/0232154 A1 | 10/2007 | Zhao et al. |
| 2013/0089996 A1 | 4/2013 | Zhao |

* cited by examiner

POWER TERMINAL CONNECTOR

CROSS REFERENCE TO RELATED APPLICATIONS

This application claims the benefit of U.S. Provisional Application No. 61/882,433 filed Sep. 25, 2013 and titled POWER TERMINAL CONNECTOR, which is a continuation-in-part application of U.S. patent application Ser. No. 13/708,202 filed Dec. 7, 2012 and titled POWER TERMINAL CONNECTOR, and which is a continuation-in-part application of U.S. patent application Ser. No. 14/031,933 filed Sep. 19, 2013 and titled POWER TERMINAL CONNECTOR, the subject matter of each of which are herein incorporated by reference in their entirety.

BACKGROUND OF THE INVENTION

The subject matter herein relates generally to power terminal connectors for connector systems.

Power terminal connectors are used in different types of connector systems. One application is an automotive application, such as for connectors of a battery of a vehicle. Some known power terminal connectors that connect between batteries use a flexible cable to allow for variation in positioning and vibration, however such power terminal connectors are typically bolt and nut connections to the terminals of the battery. Such systems require many parts and a lengthy assembly time to the batteries. Such systems have over-torque, under-torque and cross thread problems.

Some known power terminal connectors are quick connection type connectors to overcome the lengthy assembly time and torque issues of the nut and bolt connections. For example, each battery may have a pin or blade and the jumper between the batteries includes power terminal connectors at each end of a cable or other interconnecting component that are pressed onto the pins or blades of adjacent batteries to make the electrical connection therebetween. The power terminal connectors typically have a terminal body that receives a spring contact. The spring contact creates a power path between the terminal body and a power terminal of the battery. Such jumpers include many parts and are typically more expensive than nut and bolt type of connectors.

An additional problem is that the components of the system need special handling to deal with high voltage, such as covers for all of the metal parts to avoid accidental touching. Such covers add additional components to the systems.

A need remains for a power terminal connector system that provides a quick connection, a flexible connection distance, is safe to handle and/or is cost effective.

BRIEF DESCRIPTION OF THE INVENTION

In one embodiment, a power terminal connector is provided including a flexible conductor having a first mounting portion, a second mounting portion and a flexible section between the first and second mounting portions. The first mounting portion is terminated directly to a power terminal of a first battery module. A female terminal is coupled to the second mounting portion. The female terminal has a terminal body having a receptacle configured to receive a power terminal of a second battery module. The terminal body is terminated to the second mounting portion to mechanically and electrically connect the terminal body to the flexible conductor. The terminal body has an open front end open to the receptacle and configured to receive the power terminal of the second battery module therethrough. A contact spring is received in the receptacle and is electrically connected to the terminal body. The contact spring has spring beams defining interfaces for the power terminal of the second battery module to create a power path to the power terminal of the second battery module.

Optionally, the flexible conductor may be welded directly to the power terminal of the first battery module. The terminal body may be welded directly to the flexible conductor. Optionally, the flexible section may include a flexible braided wire. The flexible section may include a plurality of flexible metallic strands bundled together. The flexible conductor may include a metal sheet folded over to have multiple layers spanning the flexible section and the first and second mounting portions.

Optionally, the terminal body may be variably positionable with respect to the power terminal of the first battery module. The flexible section may allow the first and second mounting portions to move with respect to one another to vary a position of the first mounting portion with respect to the second mounting portion. Optionally, the flexible section may be U-shaped having a first leg and a second leg movable with respect to one another to change an angle between the first and second legs to change the spacing between the first and second mounting portions.

Optionally, the terminal body may be box-shaped including a top wall, a bottom wall and opposite side walls defining the receptacle. The bottom wall may be welded to the first mounting portion to mechanically and electrically connect the first terminal to the flexible conductor.

Optionally, the contact spring may include a first band and a second band with the spring beams extending between the first and second bands. Each spring beam may have at least two contact bumps between the first and second bands defining interfaces for the power terminal of the second battery module. The contact spring may include overstress bumps approximately centrally positioned along each spring beam. The overstress bumps may engage the terminal body to create a power path between the corresponding spring beam and the terminal body. The spring beams may have contact bumps configured to engage the power terminal of the second battery module. The contact bumps may be staggered relative to a front end of the terminal body.

Optionally, the terminal body may have a series of notches separated by posts at the front end. The contact spring may have a series of tabs at a front thereof separated by gaps. The tabs may be received in corresponding notches and the gaps may receive corresponding posts to secure the contact spring in the terminal body. The tabs may be held in the notches and may be electrically connected to the terminal body in the notches. The posts may be held in the gaps and may be electrically connected to the contact spring. Optionally, the posts may be flared to create flared edges that overlap and engage the tabs.

Optionally, the terminal body may include a top wall and a bottom wall. The top wall and bottom wall may each having notches receiving corresponding tabs. The terminal body may include a rear end opposite the front end having notches separated by posts. The contact spring may have tabs extending from a rear thereof received in corresponding notches in the rear end. Each tab may have multiple points of contact with the terminal body.

DETAILED DESCRIPTION OF THE INVENTION

Figure 1:
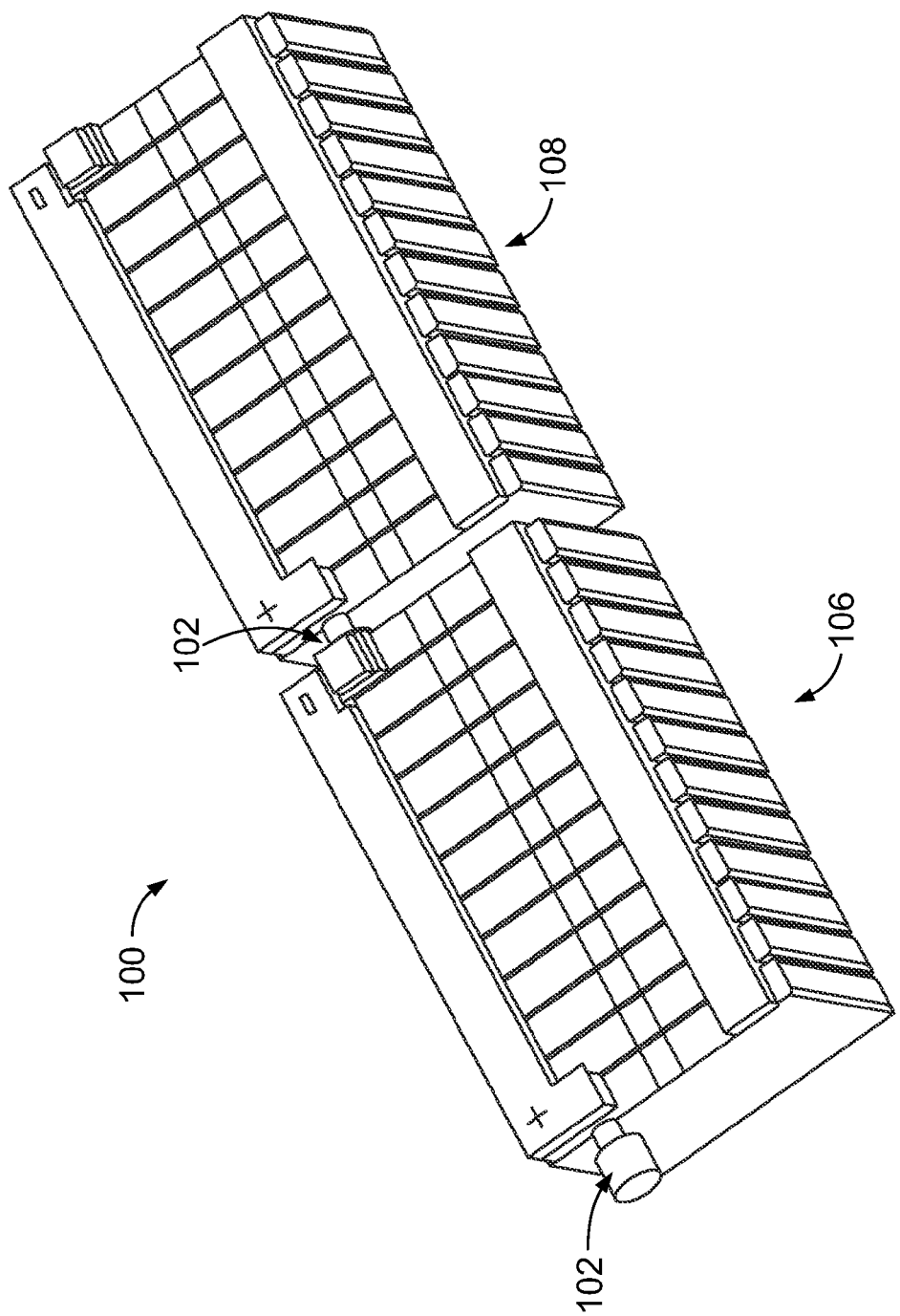
FIG. 1 illustrates an electrical system using a power terminal connector formed in accordance with an exemplary embodiment to connect battery modules.

FIG. 1 illustrates an electrical system 100 using a power terminal connector 102 formed in accordance with an exemplary embodiment to connect modules 106, 108. The modules 106, 108 may be batteries and may be referred to hereinafter as batteries or battery modules 106, 108. The electrical system 100 may be a power supply system. The power terminal connector 102 may be used in an automotive application, such as part of a high voltage battery system of a hybrid or electric vehicle. The power terminal connector 102 may be used in different applications in alternative embodiments.

Figure 2:
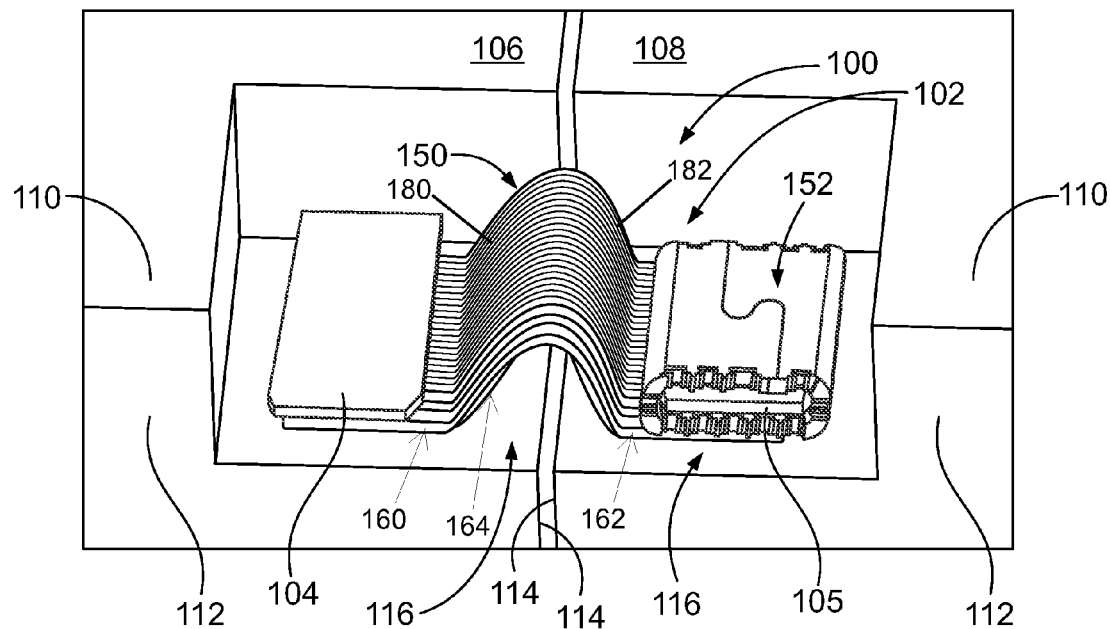
FIG. 2 illustrates a portion of the electrical system showing the power terminal connector electrically connecting the adjacent battery modules.

FIG. 2 illustrates a portion of the electrical system 100 showing the power terminal connector 102 electrically connecting the adjacent battery modules 106, 108. The power terminal connector 102 includes a flexible conductor 150 and a female terminal 152 terminated to the flexible conductor 150 to mechanically and electrically connect the female terminal 152 to the flexible conductor 150. The power terminal connector 102 is electrically connect to corresponding first and second power terminals 104, 105 of the batteries 106, 108.

The power terminal connector 102 electrically connects the batteries 106, 108. The power terminal connector 102 represents a buss or jumper that interconnects the batteries 106, 108. The batteries 106, 108 may be any voltage battery used in a vehicle. Optionally, the vehicle may be an electric, hybrid-electric vehicle, or any energy storage system and the batteries 106, 108 may be used as part of the power system for the electric vehicle or hybrid-electric vehicle or any energy storage systems.

The power terminal connector 102 is a quick connect/quick disconnect type of connector that may be easily and quickly terminated to the power terminal 105 of the battery 108. The power terminal connector may be permanently jointed to the power terminal 104. The power terminal connector 102 has a very low profile so as to conserve space around the batteries 106, 108. The power terminal connector 102 may be connected by other types of components other than the power terminals 104, 105 in alternative embodiments.

Each of the batteries 106, 108 includes a top 110, a front 112 perpendicular to the top 110, and a side 114 perpendicular to the top 110 and the front 112. The sides 114 of the batteries 106, 108 face one another. The top 110, front 112 and side 114 generally meet at a corner of the battery 106, 108. In an exemplary embodiment, the battery 106, 108 includes a notched-out area 116 at the corner. The notched-out area 116 is recessed below the top 110, behind the front 112, and inward from the side 114. The notched-out area 116 defines a window or envelope defined by planes extending along the top 110, front 112 and side 114.

The flexible conductor 150 spans across the interface between the sides 114 of the batteries 106, 108 and the power terminal connectors 102 are positioned in both notched-out areas 116. The power terminals 104, 105 are provided at the corresponding notched-out areas 116. The power terminal connectors 102 are received in the notched-out areas 116 such that the power terminal connector 102 does not extend beyond (e.g., above) the tops 110 of the batteries 106, 108. The power terminal connector 102 is received in the notched-out areas 116 such that the power terminal connector 102 does not extend beyond (e.g., outward from) the fronts 112 of the batteries 106, 108. As such, other components, such as another battery may be positioned immediately in front of the batteries 106, 108 without interference from the power terminal connectors 102. Another component, such as a cover or lid may extend along the tops 110 of the batteries 106, 108 without interference from the power terminal connectors 102. In an alternative embodiment, recessing of the power terminal connectors 102 may not be necessary, such as when no space constraints are required. For example, the power terminals 104, 105 may be exposed along the tops 110 of the batteries 106, 108 and the power terminal connector 102 may span across the space between the batteries 106, 108.

In an exemplary embodiment, the flexible conductor 150 is a flexible connector that allows relative movement between the batteries 106, 108. In an exemplary embodiment, the female terminal 152 is terminated to one end of the flexible conductor 150. Such female terminal 152 may be quickly connected to and disconnected from the power terminal 105, such as by plugging onto and unplugging from the power terminal 105. The other end of the flexible conductor 150 is directly and permanently terminated to the first power terminal 104, which may be a positive terminal of the corresponding battery 106. For example, the flexible conductor 150 may be laser welded, ultrasonically welded or welded by other processes. In other embodiments, the flexible conductor 150 may be mechanically and electrically terminated to the power terminal 104 by other means and processes. Such direct connection to the first power terminal 104 eliminates the need for a second female terminal and saves the space needed for a second female terminal. Such direct connection eliminates many components and thus reduces the overall cost of the power terminal connector 102.

The flexible conductor 150 may be a stack of copper sheets. The flexible conductor 150 may be a braided cable that is flexible. The flexible conductor 150 may be a wire or cable with one or more strands or wires that form the conductor. The flexible conductor 150 spans across the interface between the sides 114 and accommodates different spacing between the batteries 106, 108, movement of the batteries 106, 108, such as from vibration, and the like. In alternative embodiments, rather than a flexible conductor, another type of component may be used to connect the power terminal connectors 102, such as a buss bar, a power plate, or another type of component.

Figure 3:
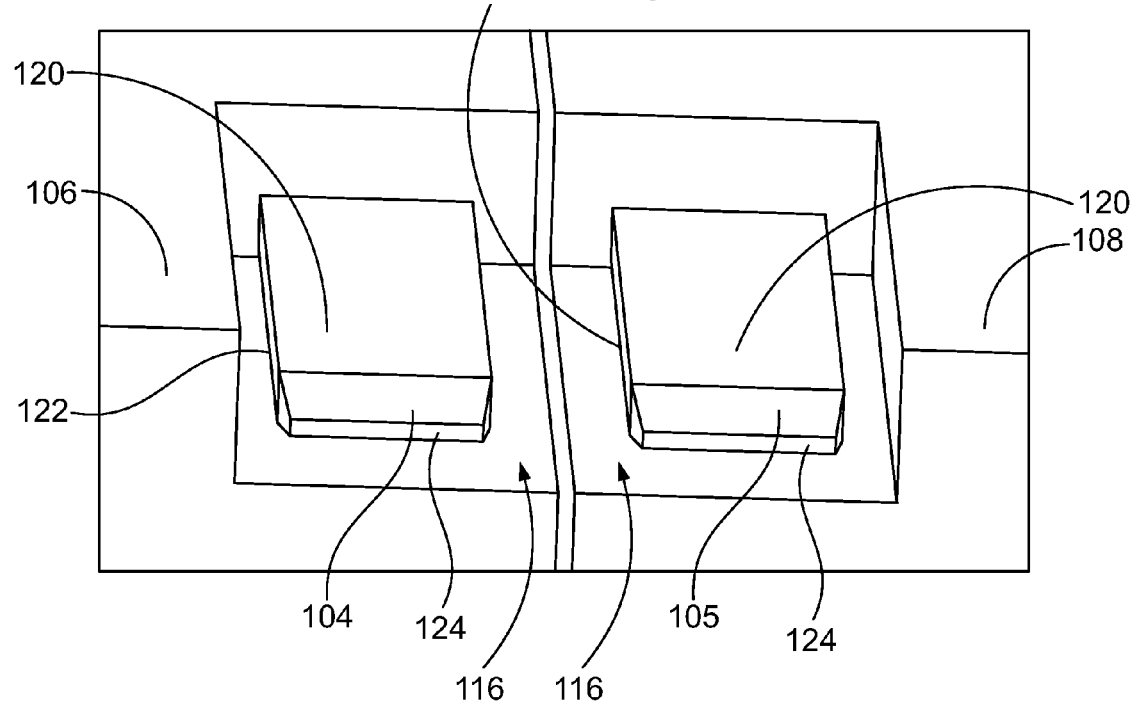
FIG. 3 illustrates a portion of the battery modules showing power terminals.

FIG. 3 illustrates a portion of the batteries 106, 108 showing the notched-out areas 116 with the power terminals 104, 105 extending from the batteries 106, 108 at corresponding notched-out areas 116. In an exemplary embodiment, the power terminals 104, 105 are fixed connectors of the batteries 106, 108 providing an interface for the power terminal connector 102 (shown in FIG. 1).

The power terminals 104, 105 extend from, and are electrically coupled to, the batteries 106, 108. The power terminals 104, 105 may be welded or bolted onto the B+ or B− terminals of corresponding cells of the batteries. In an exemplary embodiment, the power terminals 104, 105 are blade terminals that are generally flat and extend along blade axes (e.g. central, longitudinal axes of the power terminals 104, 105). Other types of power terminals may be used in alternative embodiments, such as posts or pins. The power terminals may have other shapes in alternative embodiments, such as cylindrical shapes. Each of the power terminals 104, 105 includes a top 120, a bottom 122 and a tip 124. The power terminals 104, 105 are illustrated as extending horizontally, however the power terminals 104, 105 may be at other orientations, such as vertically.

With additional reference to FIG. 2, during assembly, the power terminal connector 102 is permanently terminated to the first power terminal 104 and the flexible conductor 150 extends from the notched-out area 116 of one battery 106 into the notched-out area 116 of the other battery 108. The female terminal 152 is plugged onto the power terminal 105 of the battery 108. The power terminal connector 102 electrically connects the power terminals 104, 105 through the flexible conductor 150. The female terminal 152 is a quick connect type connector that may be quickly and easily coupled to the power terminal 105. The female terminal 152 may be coupled to the power terminal 105 without the use of any tools. The female terminal 152 may be coupled by simply pressing the female terminal 152 onto the power terminal 105 in a loading direction without any other actuation, locking or latching required.

With reference to FIG. 2, in an exemplary embodiment, the flexible conductor 150 may be a buss bar used to buss two powered components. Optionally, multiple flexible conductors may be used to increase the current carrying capacity of the power terminal connector 102, such as multiple flexible conductors arranged in a stacked configuration and mechanically and electrically connected to the female terminal 152 and power terminal 104 (shown in FIG. 3).

The flexible conductor 150 includes a first mounting portion 160, a second mounting portion 162 and a flexible section 164 between the first and second mounting portions 160, 162. The first mounting portion 160 is configured to be terminated directly and permanently to the first power terminal 104. The female terminal 152 is coupled to the second mounting portion 162. In an exemplary embodiment, the female terminal 152 is welded to the mounting portion 162. For example, the female terminal 152 may be laser welded, ultrasonically welded or welded by other processes. In other embodiments, the female terminal 152 may be mechanically and electrically terminated to the flexible conductor 150 by other means and processes.

In an exemplary embodiment, the first mounting portion 160, second mounting portion 162 and/or flexible section 164 include a plurality of flexible metal (e.g. copper) strands bundled together. Using many small strands allows the conductor to remain more flexible as compared to a single big solid wire. Additionally, the stranded conductor may be scaled up or down by using a conductor having greater or fewer strands to control the current carrying capacity of the buss bar, wherein more strands allows for a higher current carrying capability. In an alternative embodiment, a high flexible stranded cable may be used that includes an insulated jacket surrounding the strand wires, exposed at the ends for termination to the female terminal 152 and power terminal 104. Such stranded cable may be used to protect from inadvertent touching of the wires. In an alternative embodiment, the flexible conductor 150 may include a flexible, braided wire. In other alternative embodiments, the flexible conductor 150 may have multiple layers of metal sheets in a stacked configuration. For example, the sheet may be folded over multiple times to create a stack-up. The number of folds in the stack-up controls the current carrying ability of the flexible conductor 150, wherein more folds (e.g. a thicker stack-up) allows for a higher current carrying capability. Additionally, the folding allows the use of a thin, flexible sheet to be used but still allow for high current carrying ability. Optionally, the layers may be laminated. It is understood that all exposed conductors may be insulated by a cover or housing.

The flexible section 164 is configured to change shape to change the relative position of the first and second mounting portions 160, 162. The flexible section 164 may be lengthened or shortened to variably position the first mounting portion 160 with respect to the second mounting portion 162. The flexible section 164 is shown in a bent state, positioning the first mounting portion 160 closer to the second mounting portion 162 than when the flexible section 164 is relatively flat. In the illustrated embodiment, the flexible section 164 is U-shaped defined by first leg 180 and a second leg 182. The first and second legs 180, 182 are movable with respect to one another to change the angle between the first and second legs 180, 182. Moving the first and second legs 180, 182 varies an axial position of the first mounting portion 160 and the second mounting portion 162. Moving the first and second legs 180, 182 changes the spacing between the first mounting portion 160 and the second mounting portion 162. Optionally, the mounting portions 160, 162 may be movable in three dimensions (e.g. X-Y-Z) with respect to one another and the flexible section 164 accommodates such movement.

The flexible conductor 150 is electrically conductive. In an exemplary embodiment, the flexible conductor 150 is manufactured from copper, however other materials may be used in alternative embodiments. In an exemplary embodiment, the first mounting portion 160, second mounting portion 162 and flexible section 164 are integral and formed from a single piece of copper. Optionally, more than one piece of copper may be used to form the conductor, such as multiple sheets of copper or multiple strands of copper wire. The first mounting portion 160, second mounting portion 162 and flexible section 164 may be a multi-layered structure. The first mounting portion 160 and second mounting portion 162 may have equal or at least one more layer than flexible section 164.

Figure 4:
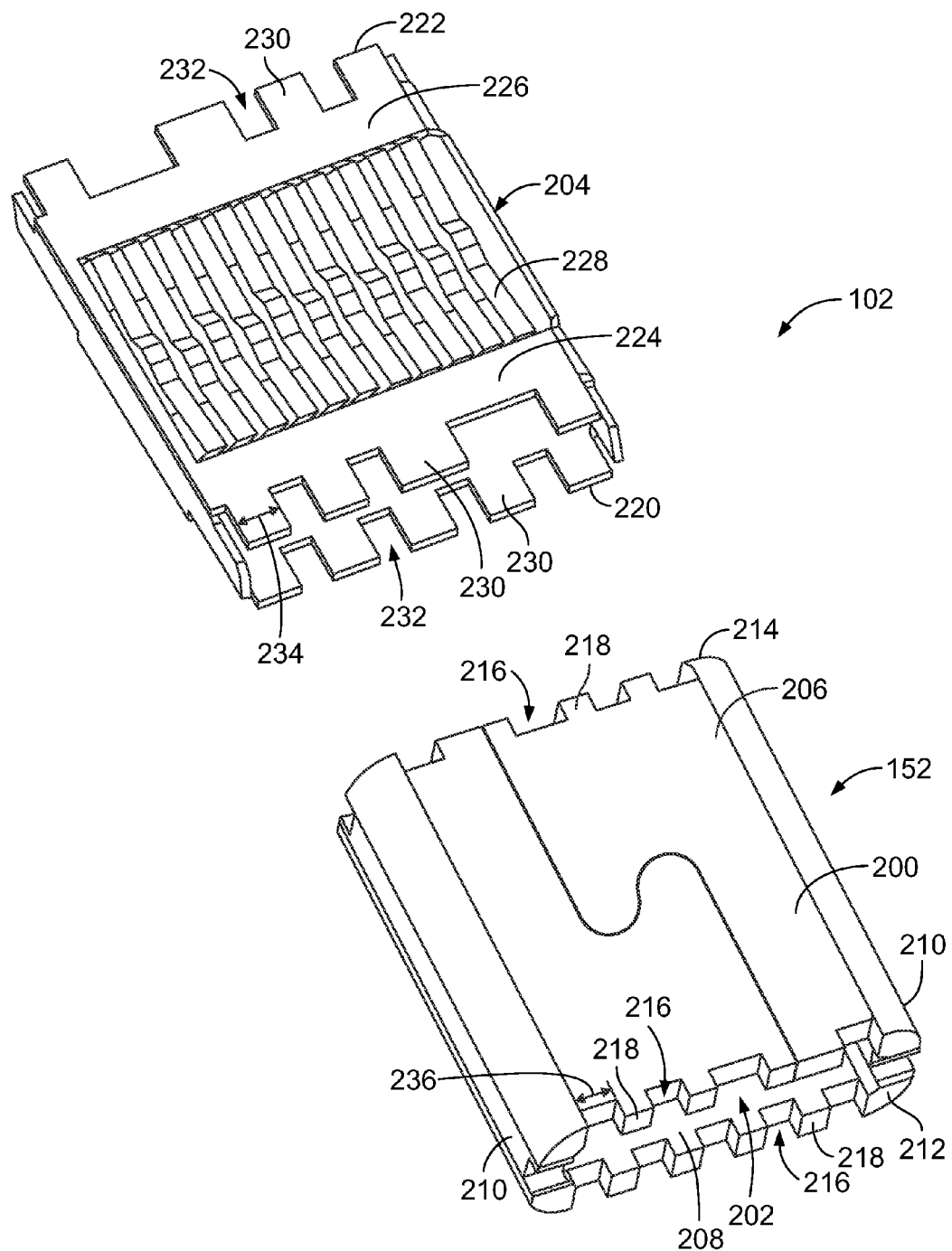
FIG. 4 is an exploded view of a power terminal connector formed in accordance with an exemplary embodiment.

FIG. 4 is an exploded view of a portion of the power terminal connector 102 showing the female terminal 152. The terminal 152 includes a terminal body 200 that is configured to be electrically connected to the flexible conductor 150 (shown in FIG. 2). In an exemplary embodiment, the terminal body 200 is separately provided from, and coupled to, the flexible conductor 150, such as by welding. In an exemplary embodiment, the terminal body 200 is box-shaped defining a receptacle 202. The receptacle 202 is sized and shaped to receive the power terminal 105 (shown in FIG. 3).

A contact spring 204 is separately provided from and configured to be received in the receptacle 202. The contact spring 204 is used to electrically connect the terminal body 200 to the power terminal 105. The contact spring 204 defines a power path between the terminal body 200 and the power terminal 105. The contact spring 204 provides multiple points of contact with the terminal body 200. The contact spring 204 provides multiple points of contact with the power terminal 105. The contact spring 204 defines a separable mating interface with the power terminal 105 to allow quick connection and quick disconnection. The contact spring 204 includes features for securing the contact spring 204 in the terminal body 200, such as to resist fretting during vibration of the contact spring 204 and the terminal body 200.

In the illustrated embodiment, the terminal body 200 is box-shaped having a rectangular cross-section; however other shapes are possible in alternative embodiments, including a cylindrical shape. The terminal body 200 includes a top wall 206, a bottom wall 208 and opposite side walls 210 that define the receptacle 202. Optionally, the flexible conductor 150 may be welded directly to the exterior of the bottom wall 208. The terminal body 200 has an open front end 212 open to the receptacle 202. The power terminal 105 is configured to be loaded into the receptacle 202 through the open front end 212. Optionally, the terminal body 200 may include an open rear end 214 opposite the front end 212. The open rear end 214 allows the power terminal 105 to pass entirely through the terminal body 200 without bottoming out against any part of the terminal body 200. In an exemplary embodiment, the terminal body 200 is a stamped and formed body having a stamped workpiece folded into the box-shape with free ends thereof being optionally secured together. Other shapes are possible in alternative embodiments.

The terminal body 200 includes securing features for securing the contact spring 204 within the receptacle 202. In the illustrated embodiment, the securing features include a series of notches 216 separated by posts 218. Optionally, the notches 216 may be provided along both the front end 212 and the rear end 214. Alternatively, the notches 216 may be provided along either the front end 212 or the rear end 214. Optionally, the notches 216 are provided along the top wall 206, the bottom wall 208 and the side walls 210. Alternatively, the notches 216 may be provided on less walls, such as the top wall 206, the bottom wall 208 or the side walls 210. The notches 216 receive portions of the contact spring 204. The contact spring 204 may be secured in the notches 216 by an interference fit. Optionally, the posts 218 may be locked around the contact spring 204. For example, the posts 218 may be flared outward into the notches 216 to capture the contact spring 204 in the notches 216. In other embodiments, latches or other features may be provided to secure the contact spring 204 in the notches 216.

The contact spring 204 extends between a front end 220 and a rear end 222. The contact spring 204 has a pair of circumferential bands, identified as a first band 224 and a second band 226 at the front and rear ends 220, 222, respectively. The first and second bands 224, 226 are configured to engage the terminal body 200 when the contact spring 204 is loaded into the receptacle 202 to electrically connect the contact spring 204 to the terminal body 200. Optionally, the bands 224, 226 may be held in the receptacle 202 by an interference fit with the top wall 206, bottom wall 208 and/or the side walls 210. Optionally, the contact spring 204 may be a stamped and formed piece.

A plurality of spring beams 228 extend between the circumferential bands 224, 226 along a top and a bottom of the contact spring 204, thus defining upper spring beams 228 and lower spring beams 228, respectively. In the illustrated embodiment, the spring beams 228 are generally inwardly tapered towards the middle of the contact spring 204. The upper and lower spring beams 228 extend toward each other at the center of the receptacle 202. The shape of the spring beams 228 ensure that the spring beams 228 engage the power terminal 105 when loaded therein. In an exemplary embodiment, the spring beams 228 are deflectable and may be deflected outward when the power terminal 105 is loaded into the contact spring 204. The contact spring 204 defines an electrical path between the power terminal 105 and the terminal body 200.

The contact spring 204 includes securing features for securing the contact spring 204 within the receptacle 202. In the illustrated embodiment, the securing features include a series of tabs 230 separated by gaps 232. The tabs 230 may be stamped with the contact spring 204 and bent into form. Optionally, the tabs 230 may extend from both the first band 224 and the second band 226. Alternatively, the tabs 230 may be provided along either the first band 224 or the second band 226. Optionally, the tabs 230 may extend generally perpendicular from the bands 224, 226. For example, the tabs 230 may be bent at approximately 90°. Optionally, the tabs 230 may extend from the first band 224 in at least two different directions. For example, the tabs 230 may extend upward from the top, extend downward from the bottom and extend outward from both sides of the corresponding bands 224, 226. Alternatively, the tabs 230 may be provided on fewer portions of the bands 224, 226, such as only the top or only the bottom.

The tabs 230 are received in corresponding notches 216. The gaps 232 receive corresponding posts 218. The tabs 230 may be secured in the notches 216 by an interference fit with the adjacent posts 218. The posts 218 may be secured in the gaps 232 by an interference fit with the adjacent tabs 230. Optionally, the posts 218 may be locked around the tabs 230. For example, the posts 218 may be flared outward in front of the tabs 230 to capture the tabs 230 in the notches 216.

The tabs 230 have corresponding tab widths 234. Optionally, different tabs 230 may have different tab widths 234. The notches 216 have corresponding notch widths 236. Optionally, different notches 216 may have different notch widths 236. The notches 216 and tabs 230 may be keyed, such as by having certain widths, to ensure a single orientation of the contact spring 204 in the terminal body 200. Optionally, the tabs 230 may be secured in the notches 216 by other means, such as by flaring the posts 218 to lock the tabs 230 in the notches 216. Alternatively, the notch widths 236 may be slightly narrower than the corresponding tab widths 234 such that the tabs 230 must be forced to fit into the notches 216. The tabs 230 are then held in the notches 216 by an interference fit.

In an alternative embodiment, rather than having the tabs 230 and notches 216, the contact spring 204 and terminal body 200 may have relatively flat front and rear edges. The contact spring 204 may rely upon an interference fit to mechanically and electrically connect the contact spring 204 to the terminal body 200.

Figure 5:
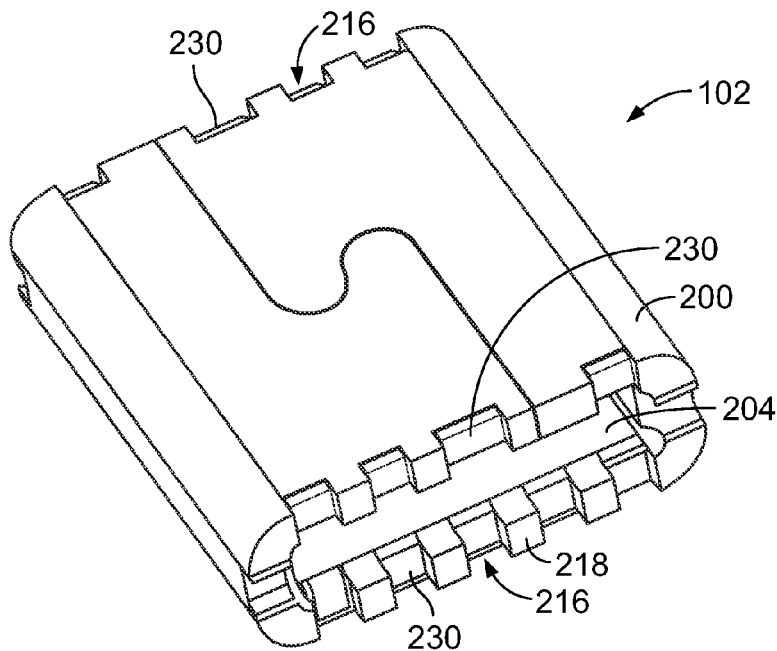
FIG. 5 is a front perspective view of a portion of the power terminal connector.

FIG. 5 is a front perspective view of the female terminal 152 showing the contact spring 204 loaded into the terminal body 200. The tabs 230 are received in corresponding notches 216 to secure the contact spring 204 in the receptacle 202. The tabs 230 may be held in the notches 216 by an interference fit. Such interference fit reduces fretting induced during vibration of the female terminal 152. Optionally, the female terminal 152 may be used as shown without flaring the posts 218 (example of flaring as shown with reference back to FIG. 1 and/or FIG. 6).

Figure 6:
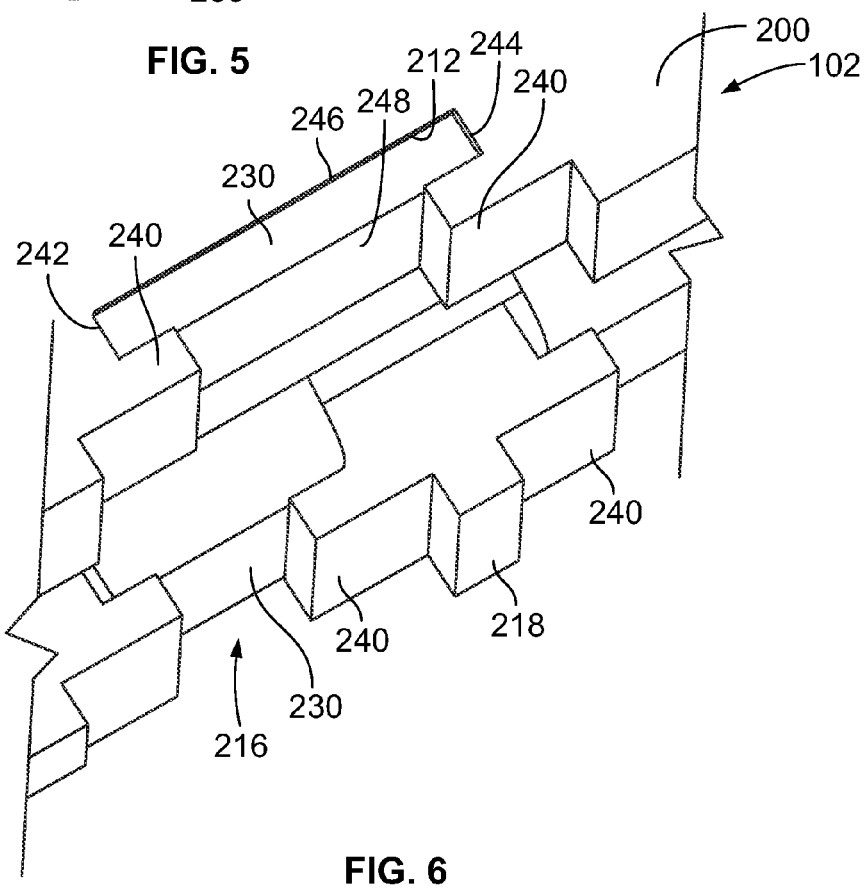
FIG. 6 is an enlarged view of a portion of the power terminal connector.

FIG. 6 is an enlarged view of a portion of the female terminal 152. FIG. 6 illustrates the posts 218 flared to secure the tabs 230 in the corresponding notches 216. The posts 218 may be flared by a tool or die.

The posts 218 are flared outward into the notches 216 to form flared edges 240. The flared edges 240 overlap the tabs 230 to lock the tabs 230 in the notches 216. The flared edges 240 engage the tabs 230 to create points of contact with the corresponding tabs 230. In an exemplary embodiment, at the front end 212 of the terminal body 200 (however a similar arrangement may occur at the rear end 214), each tab 230 engages the front end 212 to create one or more points of contact therewith, each tab 230 engages one or both posts 218 on each side of the corresponding tab 230 to create one or more points of contact therewith and each tab 230 engages one or more flared edges 240 to create one or more points of contact therewith. For example, the tabs 230 each include first and second edges 242, 244 and first and second sides 246, 248 extending between the first and second edges 242, 244. The first and second edges 242, 244 and first and second sides 246, 248 each have at least one point of contact with the terminal body 200 to create a power path between the terminal body 200 and the contact spring 204. For example, the first and second edges 242, 244 engage the posts 218. The first side 246 engages the front end 212. The second side 248 engages the flared edges 240. Furthermore, the first band 224 may engage the terminal body 200 to create one or more points of contact therewith. Each point of contact defines a power path between the contact spring 204 and the terminal body 200. Having many points of contact between the contact spring 204 and the terminal body 200 lowers the resistance across such interface and allows higher current to flow across the interface.

Figure 7:
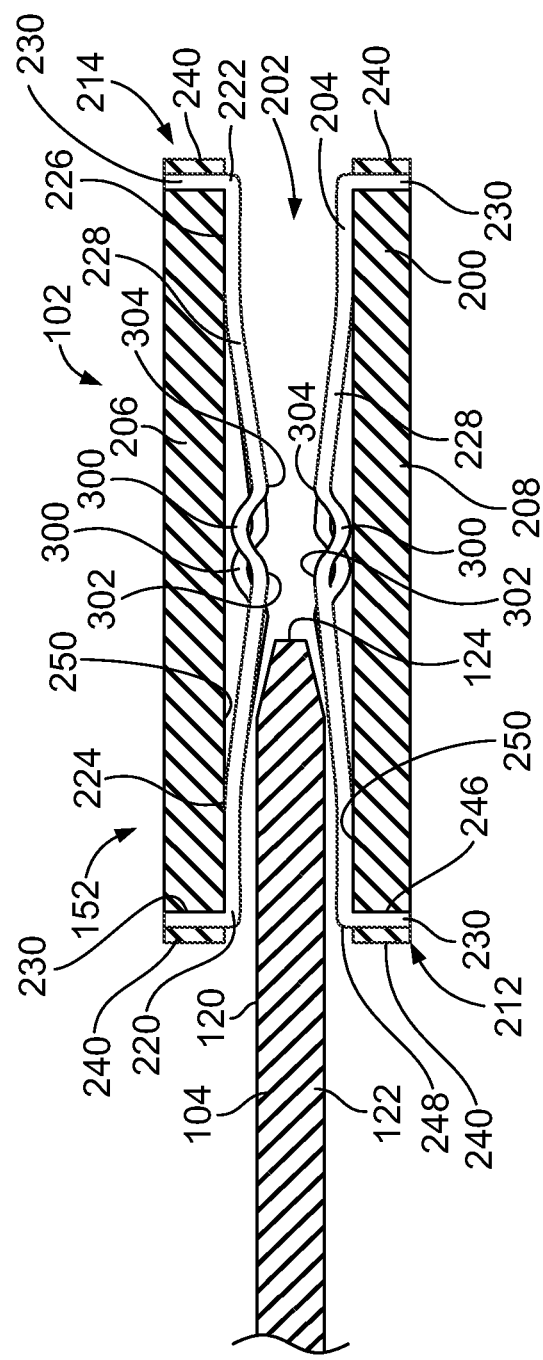
FIG. 7 is a cross sectional view of a portion of the power terminal connector showing a power terminal loaded into the power terminal connector.

FIG. 7 is a cross sectional view of a portion of the female terminal 152 showing the power terminal 105 being loaded into the terminal 152. The tip 124 of the power terminal 105 is loaded into the receptacle 202 and into the contact spring 204. The upper and lower spring beams 228 engage the top 120 and bottom 122 of the power terminal 105 to electrically connect the terminal 152 to the power terminal 105.

The contact spring 204 is loaded into the receptacle 202 such that the first and second bands 224, 226 abut against and engages interior surfaces 250 of the top and bottom walls 206, 208 (and the side walls 210 shown in FIG. 2) proximate to the front and rear ends 212, 214, respectively. The bands 224, 226 each define at least one point of contact with the terminal body 200 to create an electrical power path between the contact spring 204 and the terminal body 200. The tabs 230 extend from the first and second bands 224, 226 along the front and rear ends 212, 214. The first side 246 of each tab 230 engages the front end 212 to create one or more points of contact with the terminal body 200. The second side 248 of each tab engages the flared edge(s) 240 when the flared edge(s) 240 are pressed against the second side 248 to create one or more points of contact with the terminal body 200.

In an exemplary embodiment, each of the spring beams 228 may define an additional point of contact with the terminal body 200 to create another electrical power path between the contact spring and the terminal body 200. For example, in an exemplary embodiment, each spring beam 228 includes an overstress bump 300 facing outward toward the terminal body 200. When the power terminal 105 is loaded into the terminal 152, the spring beams 228 are deflected outward. The overstress bumps 300 are forced outward until the overstress bumps 300 engage the terminal body 200. The spring beams 228 are electrically connected to the terminal body 200 via the direct engagement between the overstress bumps 300 and the terminal body 200, such as along the top wall 206 or the bottom wall 208. The overstress bumps 300 limit the amount of deflection of the spring beams 228 preventing overstress and/or plastic deformation of the spring beams 228. When the overstress bumps 300 engage the terminal body 200 further deflection of the spring beams 228 increases the spring force imparted onto the power terminal 105 because the effective beam length of the spring beams 228 is reduced when the overstress bumps 300 engage the terminal body 200.

In an exemplary embodiment, each of the spring beams 228 includes at least two contact bumps 302, 304. The contact bumps 302, 304 define interfaces of the spring beams 228 that are configured to engage the power terminal 105. As such, each spring beam 228 includes multiple points of contact with the power terminal 105 creating a better electrical connection therebetween. The contact bumps 302, 304 are the interior-most portions of the spring beams 228 that are furthest interior from the terminal body 200. The contact bumps 302, 304 are the portions of the spring beams 228 that directly engage the power terminal 105 when the power terminal 105 is loaded into the terminals 152. Optionally, the contact bumps 302, 304 may be defined by the overstress bump 300. For example, the contact bumps 302 304 may be located where the spring beams 228 start to transition or are formed outward to define the overstress bumps 300. The overstress bumps 300 are located between the contact bumps 302, 304.

Optionally, the overstress bumps 300 and corresponding contact bumps 302, 304 may be approximately centered along the spring beams 228 between the first and second bands 224, 226. Optionally, the spring beams 228 may be formed with offset overstress bumps 300 and offset contact bumps 302, 304. For example, adjacent spring beams 228 may have the bumps 300, 302, 304 offset to a forward position or a rearward position (e.g. closer to the front end 220 or closer to the rear end 222, respectively). Such staggering reduces the total insertion force for mating the female terminal 152 to the power terminal 105. Optionally, rather than having each alternating spring beam 228 staggered, other patterns of offsetting of the bumps 300, 302, 304 may be utilized, such as having all of the upper spring beams 228 being staggered forward and all of the lower spring beams 228 staggered rearward. Optionally, the bumps 300, 302, 304 may be staggered at more than two different positions.

Figure 8:
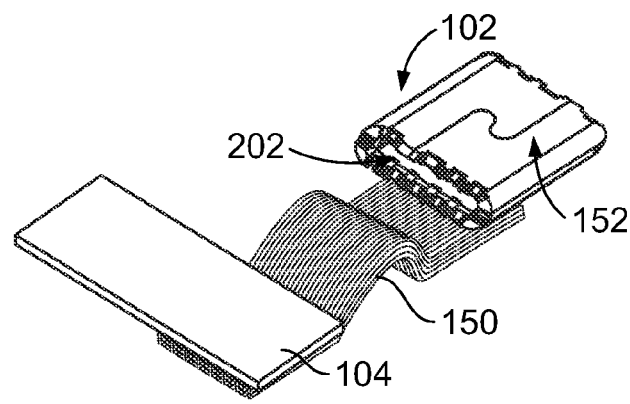
FIG. 8 illustrates the power terminal connector coupled to a power terminal.

FIG. 8 illustrates the power terminal connector 102 coupled to the first power terminal 104 with the female terminal 152 in a different orientation. The female terminal 152 is rotated 90° relative to the orientation shown in FIG. 2. The receptacle 202 is oriented parallel to the longitudinal axis of the flexible conductor 150. The flexible conductor 150 is oriented perpendicular to a longitudinal axis of the first power terminal 104.

Figure 9:
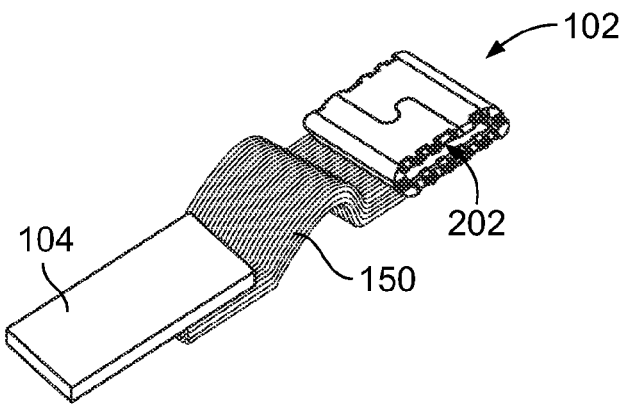
FIG. 9 illustrates the power terminal connector coupled to a power terminal.

FIG. 9 illustrates the power terminal connector 102 coupled to the first power terminal 104 in a different orientation than the orientation shown in FIG. 8. The flexible conductor 150 is oriented parallel to the longitudinal axis of the first power terminal 104. The receptacle 202 is oriented perpendicular to the longitudinal axis of the flexible conductor 150.

Figure 10:
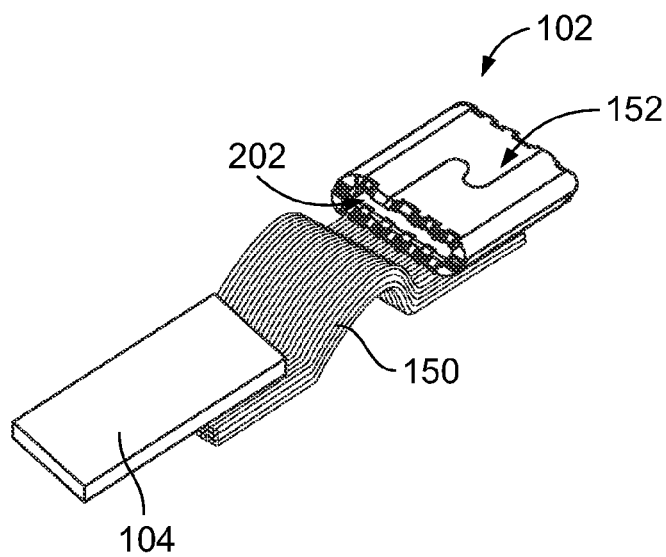
FIG. 10 illustrates the power terminal connector coupled to a power terminal.

FIG. 10 illustrates the power terminal connector 102 coupled to the first power terminal 104 with the female terminal 152 in a different orientation than the orientation shown in FIG. 9. The receptacle 202 is oriented parallel to the longitudinal axis of the flexible conductor 150. The flexible conductor 150 is oriented parallel to a longitudinal axis of the first power terminal 104.

Figure 11:
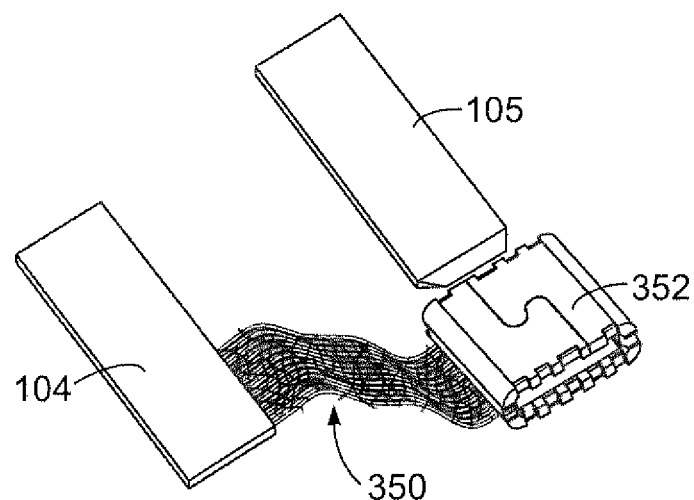
FIG. 11 illustrates a flexible conductor of a power terminal connector in accordance with an exemplary embodiment.

FIG. 11 illustrates a flexible conductor 350 including flexible braided wires. For example, the flexible conductor 350 may include copper braided wires. The weave pattern may affect the flexibility of the structure. The size of the wires may affect the flexibility of the structure. The flexible conductor 350 is terminated to the first power terminal 104. A female terminal 352 is terminated to an opposite end of the flexible conductor 350 and is poised for mating with the second power terminal 105.

Figure 12:
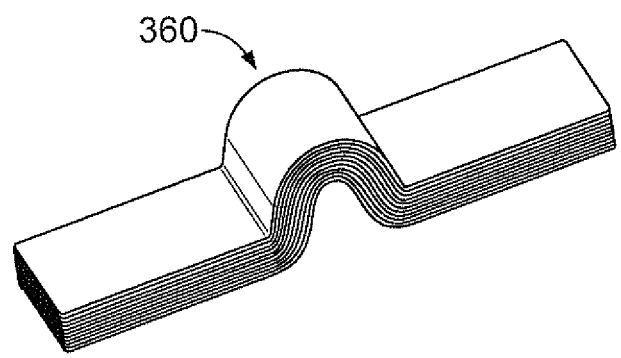
FIG. 12 illustrates a flexible conductor of a power terminal connector in accordance with an exemplary embodiment.

FIG. 12 illustrates a flexible conductor 360 having multiple layers of flexible metal sheets. Optionally, the sheets may be laminated. The sheets may be folded such that the flexible conductor 360 is made from a single sheet formed into multiple layers. Gaps between the layers allow the structure to be flexible. The sheet thickness may affect the flexibility of the structure. One end of the flexible conductor 360 may be terminated directly to the power terminal 104 (shown in FIG. 3) and the other end of the flexible conductor 360 may have a female terminal connected thereto.

Figure 13:
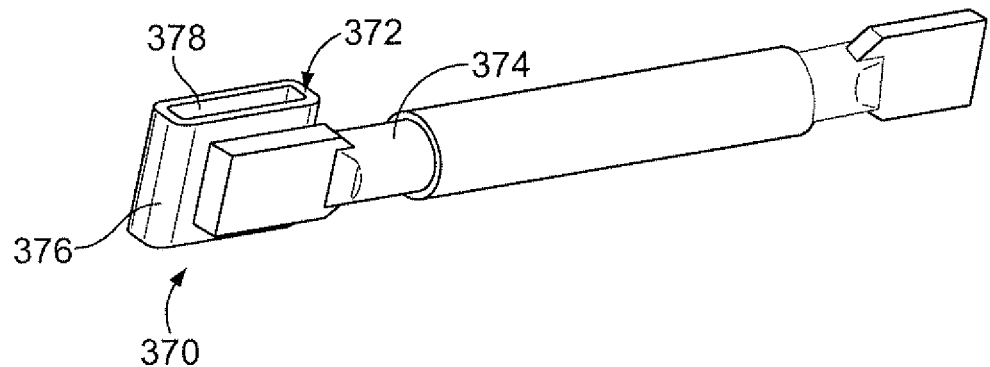
FIG. 13 illustrates a flexible conductor of a power terminal connector in accordance with an exemplary embodiment.

FIG. 13 illustrates a power terminal connector 370 formed in accordance with an exemplary embodiment. The power terminal connector 370 includes a female terminal 372 terminated to one end of a flexible conductor 374. The other end of the flexible conductor is configured to be terminated to a power terminal, such as the power terminal 104 (shown in FIG. 3) of the battery 106 (shown in FIG. 3). The power terminal connector 370 may be welded to the corresponding power terminal. In an exemplary embodiment, the flexible conductor 374 is a cable and may be referred to hereinafter as cable 374. The female terminal 372 may be welded to the end of the cable 374. Optionally, the cable 374 may be terminated or welded 90° to the illustrated cable orientation, or at another orientation. The female terminal 372 may be similar to the female terminal 152 (shown in FIG. 2), including a terminal body 376 and a contact spring 378.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. § 112, sixth paragraph, unless and until such claim limitations expressly use the phrase "means for" followed by a statement of function void of further structure.

What is claimed is:

1. A power terminal connector comprising:
   a flexible conductor having a first mounting portion, a second mounting portion and a flexible section between the first and second mounting portions, the first mounting portion being terminated directly to a power terminal of a first battery module;
   a female terminal coupled to the second mounting portion, the female terminal comprising:
   a terminal body having a receptacle configured to receive a power terminal of a second battery module, the terminal body being terminated to the second mounting portion to mechanically and electrically connect the terminal body to the flexible conductor, the terminal body having an open front end open to the receptacle and configured to receive the power terminal of the second battery module therethrough; and
   a contact spring received in the receptacle and being electrically connected to the terminal body, the contact spring having spring beams defining interfaces for the power terminal of the second battery module to create a power path to the power terminal of the second battery module.

2. The power terminal connector of claim 1, wherein the flexible conductor is welded directly to the power terminal of the first battery module.

3. The power terminal connector of claim 1, wherein the terminal body is welded directly to the flexible conductor.

4. The power terminal connector of claim 1, wherein the terminal body is variably positionable with respect to the power terminal of the first battery module.

5. The power terminal connector of claim 1, wherein the flexible section allows the first and second mounting portions to move with respect to one another to vary a position of the first mounting portion with respect to the second mounting portion.

6. The power terminal connector of claim 1, wherein the flexible section comprises a flexible braided wire.

7. The power terminal connector of claim 1, wherein the flexible section comprises a plurality of flexible metallic strands bundled together.

8. The power terminal connector of claim 1, wherein the flexible conductor comprises a metal sheet folded over to have multiple layers spanning the flexible section and the first and second mounting portions.

9. The power terminal connector of claim 1, wherein the flexible section is U-shaped having a first leg and a second leg, the first and second legs movable with respect to one another to change an angle between the first and second legs to change the spacing between the first and second mounting portions.

10. The power terminal connector of claim 1, wherein the terminal body is box-shaped including a top wall, a bottom wall and opposite side walls defining the receptacle, the bottom wall being welded to the first mounting portion to mechanically and electrically connect the first terminal to the flexible conductor.

11. The power terminal connector of claim 1, wherein the contact spring includes a first band and a second band, the spring beams extending between the first and second bands, each spring beam having at least two contact bumps between the first and second bands defining interfaces for the power terminal of the second battery module.

12. The power terminal connector of claim 1, wherein the contact spring includes overstress bumps approximately centrally positioned along each spring beam, the overstress bumps engaging the terminal body to create a power path between the corresponding spring beam and the terminal body.

13. The power terminal connector of claim 1, wherein the spring beams have contact bumps configured to engage the power terminal of the second battery module, the contact bumps being staggered relative to a front end of the terminal body.

14. The power terminal connector of claim 1, wherein the terminal body has a series of notches separated by posts at the front end, the contact spring having a series of tabs at a front thereof separated by gaps, the tabs being received in corresponding notches and the gaps receiving corresponding posts to secure the contact spring in the terminal body.

15. The power terminal connector of claim 14, wherein the tabs are held in the notches and are electrically connected to the terminal body in the notches.

16. The power terminal connector of claim 14, wherein the posts are held in the gaps and are electrically connected to the contact spring.

17. The power terminal connector of claim 14, wherein the posts are flared to create flared edges, the flared edges overlap and engage the tabs.

18. The power terminal connector of claim 14, wherein the terminal body includes a top wall and a bottom wall, the top wall and bottom wall each having notches receiving corresponding tabs.

19. The power terminal connector of claim 14, wherein the terminal body includes a rear end opposite the front end, the rear end having notches separated by posts, the contact spring having tabs extending from a rear thereof received in corresponding notches in the rear end.

20. The power terminal connector of claim 14, wherein each tab has multiple points of contact with the terminal body.

\* \* \* \* \*